(12) United States Patent
Cuttner

(10) Patent No.: US 8,872,976 B2
(45) Date of Patent: Oct. 28, 2014

(54) IDENTIFICATION OF 3D FORMAT AND GRAPHICS RENDERING ON 3D DISPLAYS

(75) Inventor: Craig Davis Cuttner, Norwalk, CT (US)

(73) Assignee: Home Box Office, Inc., New York, NY (US)

( * ) Notice: Subject to any disclaimer, the term of this patent is extended or adjusted under 35 U.S.C. 154(b) by 176 days.

(21) Appl. No.: 13/383,679

(22) PCT Filed: Jul. 14, 2010

(86) PCT No.: PCT/US2010/041922
§ 371 (c)(1),
(2), (4) Date: Jan. 12, 2012

(87) PCT Pub. No.: WO2011/008821
PCT Pub. Date: Jan. 20, 2011

(65) Prior Publication Data
US 2012/0113115 A1    May 10, 2012

Related U.S. Application Data

(60) Provisional application No. 61/225,638, filed on Jul. 15, 2009.

(51) Int. Cl.
*H04N 5/50* (2006.01)
*H04N 13/00* (2006.01)

(52) U.S. Cl.
CPC ........ *H04N 13/007* (2013.01); *H04N 2213/007* (2013.01); *H04N 13/004* (2013.01)
USPC ............. 348/569; 348/51; 348/468; 345/419

(58) Field of Classification Search
USPC .................. 359/458, 462, 466, 467, 470, 472
See application file for complete search history.

(56) References Cited

U.S. PATENT DOCUMENTS

| 6,101,274 A * | 8/2000 | Pizano et al. ......... 382/176 |
| 6,243,419 B1 * | 6/2001 | Satou et al. ......... 375/240.13 |
| 7,002,618 B2 * | 2/2006 | Lipton et al. ......... 348/51 |

(Continued)

FOREIGN PATENT DOCUMENTS

WO    2008115222 A1    9/2008

OTHER PUBLICATIONS

International Search Report and Written Opinion dated Sep. 14, 2010, for PCT/US10/41922, filed on Jul. 14, 2010, (9 pages).

*Primary Examiner* — Xiao Wu
*Assistant Examiner* — Steven Elbinger
(74) *Attorney, Agent, or Firm* — Mendelsohn, Drucker & Dunleavy, P.C.; Edward J. Meisarosh; Steve Mendelsohn

(57) ABSTRACT

In one embodiment, a 3D display has an image processor including an overlay detector connected to a display controller. The image processor receives a 3D-compatible image stream from a 2D legacy device that may superimpose overlays, e.g., a 2D captions, over 3D-compatible images. The overlay detector automatically determines whether a received image comprises a caption overlay and, if so, provides the location and dimensions of the overlay to the display controller. The display controller processes the overlaid 3D-compatible image to isolate the caption characters of the caption overlay and generates, for a viewer of the 3D display, different left-eye and right-eye images, each including overlaid caption characters that substantially match the characters of the caption overlay. The result is the appearance, to the viewer, of a substantially flat and coherent caption overlay over a 3D image.

20 Claims, 4 Drawing Sheets

(56) References Cited

U.S. PATENT DOCUMENTS

| | | |
|---|---|---|
| 2001/0015753 A1 | 8/2001 | Myers |
| 2003/0156188 A1 | 8/2003 | Abrams, Jr. |
| 2004/0032488 A1 | 2/2004 | Harman |
| 2004/0101043 A1 | 5/2004 | Flack et al. |
| 2009/0142041 A1* | 6/2009 | Nagasawa et al. ............ 386/124 |
| 2009/0190095 A1* | 7/2009 | Ellinger et al. .................... 353/7 |
| 2010/0045780 A1* | 2/2010 | Kwon et al. .................... 348/51 |
| 2010/0188572 A1* | 7/2010 | Card, II ......................... 348/468 |

* cited by examiner

IDENTIFICATION OF 3D FORMAT AND GRAPHICS RENDERING ON 3D DISPLAYS

This application claims the benefit of the filing date of U.S. Provisional Application No. 61/225,638 filed on Jul. 15, 2009, the teachings of which are incorporated herein by reference in their entirety.

BACKGROUND OF THE INVENTION

1. Field of the Invention

The current invention relates to the processing of imaging data, and more specifically, but not exclusively, to the processing of imaging data used for three-dimensional (3D) displays.

2. Description of the Related Art

A stereoscopic 3D video display allows a viewer to perceive an image rendered on a two-dimensional (2D) display as a 3D image. This effect is achieved by first generating different images for the left and right eyes and then simultaneously presenting each different image to the corresponding eye. Different left and right images may be generated, for example, by recording a scene using two cameras separated by about 65 mm, which approximates the left/right ocular separation for human adults. When those images are then respectively provided to a viewer's corresponding eyes, the parallax effect of the two recording cameras is recreated, thereby allowing for the perception of depth and the appearance of three dimensionality. One exemplary way to provide different images to a user's left and right eyes is to use 3D glasses compatible with the video-rendering display. For example, in the case of stereoscopic displays, various manufacturers have provided (i) active shutter-type glasses to interleave left-eye and right-eye images and (ii) polarization-type displays, where polarization is used to respectively provide left and right eye images to viewers' eyes.

FIGS. 1A and 1B show portions of two exemplary simplified transmission paths for a 3D image, such as a single frame of a 3D video. Left-eye image 101 and right-eye image 102 represent two views of a scene and exhibit exaggerated parallax, for effect. Note that actual left-eye and right-eye images would typically look fairly similar when viewed side by side. In some newer and/or high-bandwidth systems, images 101 and 102 are kept separate throughout their transmission for display rendering. In some systems, however, images 101 and 102 are processed and combined for transmission in a 3D-compatible format via a legacy 2D transmission system and then processed again and separated for display rendering on a 3D display.

Note that, unless otherwise specified, for purposes of some exemplary descriptions herein, the images transmitted and processed correspond to raster-formatted rectangular images of 1920h×1080v pixels (where "h" and "v" stand for horizontal and vertical, respectively), which are compatible with an HDTV (high-definition television) format. Embodiments of the invention are not limited to the above dimensions or formats.

FIG. 1A shows left-eye image 101 and right-eye image 102 processed and combined, for transmission, into side-by-side (or left/right) image 103, which comprises (i) left-side image 104 and (ii) right-side image 105, where left-eye image 101 is encoded as left-side image 104 and right-eye image 102 is encoded as right-side image 105. Note that this order may be reversed. Images 104 and 105 are each 960h×1080v pixels in size. In other words, images 104 and 105 are compressed and comprise half as many pixels as images 101 and 102, respectively. This compression may be achieved, for example, by removing every other vertical line from the original image. After transmission, images 104 and 105 are processed to generate reconstructed left-eye image 106 and reconstructed right-eye image 107, respectively. The reconstructed images may be generated by methods such as pixel-doubling, interleaving, interpolation, and/or other methods for constructing decompressed images, now known or later developed.

FIG. 1B shows left-eye image 101 and right-eye image 102 processed and combined, for transmission, into top/bottom image 108, which comprises (i) top-part image 109 and (ii) bottom-part image 110, where left-eye image 101 is encoded as top-part image 109 and right-eye image 102 is encoded as bottom-part image 110. Note that this order may be reversed. Images 109 and 110 are each 1920h×540v pixels in size. In other words, images 109 and 110 are compressed and comprise half as many pixels as images 101 and 102, respectively. This compression may be achieved, for example, by removing every other horizontal line from the original image. After transmission, images 109 and 110 are processed to generate reconstructed left-eye image 111 and reconstructed right-eye image 112, respectively.

Note that side-by-side image 103, top/bottom image 108, and other formats for encoding two related images into a single combined image that preserves about half of the pixels of each original image are generically referred to herein as 3D-compatible split-screen-format images, or 3D-compatible images for short. 3D-compatible images are treated by conventional 2D devices as conventional 2D images, thereby allowing transmission of 3D-compatible images using legacy 2D devices. Problems can arise, however, because the conventional 2D devices are not aware they are processing 3D-compatible images and may overlay 2D imagery over the 3D-compatible images and thereby cause undesired results.

FIG. 2 shows the effects of an exemplary overlay on top/bottom image 108 of FIG. 1B. In FIG. 2, a 2D device, such as a legacy set-top box (STB) (not shown) overlays closed captioning (CC) region 202 over top/bottom image 108 to generate image 201. Image 201 is processed to generate reconstructed left-eye image 111, as in FIG. 1B, and reconstructed right-eye image 203, where CC overlay 202 is transformed into vertically-stretched CC overlay 204, which appears over only the reconstructed right-eye image. When a viewer sees images 111 and 203, the 3D effect would be ruined in the area of CC overlay 204. In addition, viewing a series of 3D images with an overlay over only one side's image may be unpleasant and trigger headaches for a viewer.

FIG. 3 shows the effects of an exemplary overlay on side-by-side image 103 of FIG. 1A. In FIG. 3, a 2D device, such as a legacy STB (not shown) overlays closed captioning (CC) region 302 over side-by-side image 103 to generate image 301. Image 301 is processed to generate reconstructed left-eye image 303 and reconstructed right-eye image 304. The left half of CC region 302 gets horizontally stretched into CC region 305 of left-eye image 303, and the right half of CC region 302 gets horizontally stretched into CC region 306 of right-eye image 304. This results in an incoherent 3D image since each eye's reconstructed image would have about half of the content of CC region 302, each half in a similar, but not necessarily identical, location of the respective image. Consequently, here, too, a 2D overlay layer would ruin the 3D effect and may be discomforting to view.

SUMMARY OF THE INVENTION

One embodiment of the invention can be a method for generating a left-eye image and a right-eye image usable to create a 3D effect. The method comprises receiving a 3D-compatible image having a left-eye portion and a right-eye portion, wherein the 3D-compatible image comprises an overlay overlaying part of at least one of the left-eye portion and the right-eye portion and the overlay has information. The method further comprises generating the left-eye image based on the left-eye portion and the overlay and generating the right-eye image based on the right-eye portion and the overlay. Both of the left-eye and right-eye images include the same information from the overlay.

Another embodiment of the invention can be an image processor comprising an overlay detector adapted to receive a 3D-compatible image having a left-eye portion and a right-eye portion. The 3D-compatible image comprises an overlay overlaying part of at least one of the left-eye portion and the right-eye portion and the overlay has information. The image processor further comprises a display controller adapted to generate a left-eye image based on the left-eye portion and the overlay and generate a right-eye image based on the right-eye portion and the overlay. Both of the left-eye and right-eye images include the same information from the overlay. The left-eye and right-eye image are usable to create a 3D effect.

Yet another embodiment of the invention can be a device for generating a left-eye image and a right-eye image usable to create a 3D effect. The device comprises means for receiving a 3D-compatible image having a left-eye portion and a right-eye portion, wherein the 3D-compatible image comprises an overlay overlaying part of at least one of the left-eye portion and the right-eye portion and the overlay has information. The device further comprises means for generating the left-eye image based on the left-eye portion and the overlay and means for generating the right-eye image based on the right-eye portion and the overlay. Both of the left-eye and right-eye images include the same information from the overlay.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

As previously described, a 3D-compatible image (in, for example, side-by-side or top/bottom format) may be transmitted in the same way as a 2D image. Similarly, a series of 3D-compatible images, as in a video stream, may be transmitted in the same way as a series of 2D images. Intermediary devices located between the originator and ultimate recipient generally do not have any inherent way or need to determine whether they are transmitting information for a 2D image or a 3D-compatible image. In other words, if 3D-compatible images are being transmitted, it is normally sufficient if only the terminal device, such as a 3D television, treats them differently from 2D images. However, as noted above, there are situations where intermediary devices' treatment of 3D-compatible images as 2D images can cause undesired results. Embodiments of this invention provide systems and methods to mitigate the effects of such undesired results.

Figure 4:
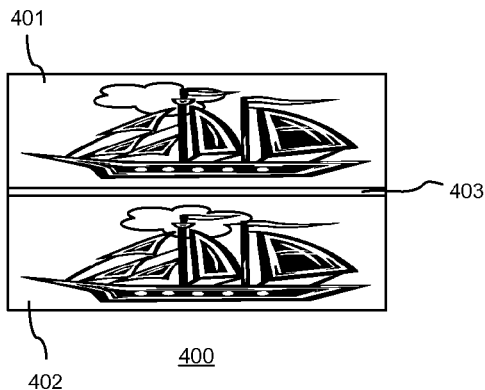
FIG. 4 shows an exemplary simplified 3D-compatible image in accordance with one embodiment of the present invention.

FIG. 4 shows exemplary simplified 3D-compatible image 400. Image 400 comprise top-part image 401, bottom-part image 402, and separation region 403. The existence of separation region 403 in image 400 indicates that image 400 contains a 3D-compatible image and the location of separation region 403 in image 400 indicates the locations and the dimensions of the left-eye and right-eye image portions, such as images 401 and 402 of image 400. Separation region 403 may be encoded as a specific and unique data pattern that is inserted into image 400 by the image creator at, for example, a network facility, a video-on-demand (VOD) encoding facility, or a digital video disk (DVD) authoring facility. The data pattern used to encode separation region 403 is of sufficient uniqueness that its luminance and/or chrominance pattern would likely never occur in a so-called natural image or its compressed-transport-stream equivalent.

Separation region 403 may be encoded using standards set by the Society of Motion Picture and Television Engineers (SMPTE). For example, Specification SMPTE-334M, Section 3, defines a standard for the carriage of Vertical Ancillary Data (VANC) on defined lines of a picture raster. Similarly, the Consumer Electronics Association (CEA) has described a method in Specification CEA-805-C (et seq.) for embedding data signals into a video image. The ability to determine whether image 400 comprises separation region 403 provides various benefits. Since the presence of separation region 403 indicates that image 400 is a 3D-compatible image, detecting the separation region may be used to automatically determine whether an image is 3D compatible.

Having an automatic 3D-compatible-image detection mode for a 3D display system is useful for allowing a user to view 2D image sequences alternated with 3D image sequences without having to manually change the display settings of the 3D display. In other words, without an automatic 3D-compatible-image detection mode, a 3D display system may erroneously attempt to display 2D images as 3D images or 3D-compatible images as 2D images, which may be confusing and/or disturbing to a viewer.

An automatic 3D-compatible-image detection mode may be particularly useful where a 3D display receives its image data via a 2D or legacy set-top box (STB). For example, if a user of a system comprising a legacy STB and a 3D display is watching a 3D program, then the 3D display is set to process the received image data as 3D-compatible images. In other words, the 3D display expands two portions of the received image and provides each expanded half to a corresponding eye of a user. If the user presses a "menu" or "guide" button for the STB during the 3D program, then the STB overlays a typical 2D menu or guide image over the program. The 3D display, unaware that it is now receiving 2D image data, would continue to process the image data as a 3D-compatible images by selecting, expanding, and providing to the corresponding eye different portions of the 2D image, which would result in a nonsensical and confusing image to a viewer.

Figure 5:
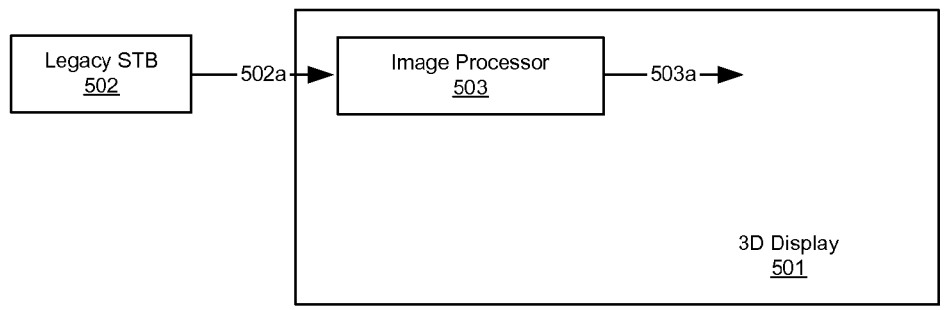
FIG. 5 shows a legacy set-top box used in conjunction with a 3D display comprising an image processor in accordance with one embodiment of the present invention.

FIG. 5 shows legacy STB 502 used in conjunction with 3D display 501, which comprises image processor 503 (along with other elements that are not shown in FIG. 5). Legacy STB 502 outputs video signal 502a to 3D display 501, where video signal 502a is received by image processor 503, which in turn outputs video signal 503a. Image processor 503 analyzes signal 502a and determines whether a received image is a 2D image or a 3D-compatible image. Based on that determination, output video signal 503a then contains either the corresponding (i) 2D image or (ii) left-eye and right-eye images. Thus, for example, if a user is watching a 3D-compatible image stream and then presses a "menu" button for legacy STB 502, then, upon detecting that the image stream switched from 3D-compatible to 2D, 3D display 501 automatically switches from 3D display mode to 2D display mode and outputs a 2D menu image via path 503a. This avoids the above-described problem of having a 2D image processed by 3D display 501 as a 3D-compatible image. In addition, 3D display 501 also automatically switches from 2D display mode to 3D display mode upon detecting that the image stream switched from 2D to 3D-compatible image data, thereby further enhancing a viewer's viewing experience and comfort.

Figure 6:
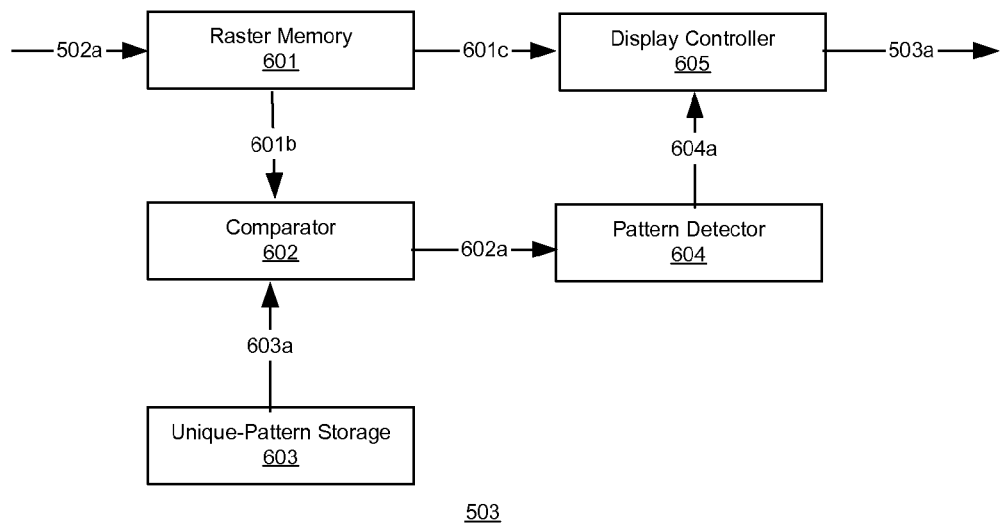
FIG. 6 shows an exemplary implementation of the image processor of FIG. 5, in accordance with one embodiment of the present invention.

FIG. 6 shows an exemplary implementation of image processor 503 of FIG. 5 for determining whether a received digital-format image includes a unique-pattern separation region, such as separation region 403 of FIG. 4. Image processor 503 comprises raster memory 601, comparator 602, unique-pattern storage 603, pattern detector 604, and display controller 605. The operations of the various modules of image processor 503 are synchronized using a common clock signal (not shown). Raster memory 601 receives digital image data via path 502a. Path 502a may be, for example, a standard HDMI (high-definition multimedia interface) cable. Raster memory 601 stores at least one image or frame of the received digital image data, or its equivalent. Unique-pattern storage 603 stores the unique-pattern encoding for the separation region and provides that encoding to comparator 602 via path 603a. Raster memory 601 provides a frame's worth of data at a time to comparator 602 via path 601b.

Comparator 602 compares the pattern received from unique-pattern storage 603 with the image data received from raster memory 601 and determines if the pattern from unique-pattern storage 603 matches any portion of the image data received from raster memory 601. Comparator 602 outputs its findings to pattern detector 604 via path 602a. Using the information from comparator 602 and additional optional inputs, such as an accuracy threshold setting (not shown), pattern detector 604 determines whether or not the image provided by raster memory 601 is a 3D-compatible image. In addition, pattern detector 604 may determine the location and type of separation region 403 and, consequently, the type of 3D-compatible image being analyzed, i.e., top/bottom or side-by-side, as well as the locations and dimensions of the left-eye and right-eye image portions. This additional information may be conveyed to display controller 605 for processing of the corresponding image data received from raster memory 601.

Display controller 605 receives image data from raster memory 601 via path 601c and a corresponding determination as to whether or not the corresponding image is 3D compatible from pattern detector 604 via path 604a. If pattern detector 604 indicates that an image is 2D, then that image is output as is by display controller 605 via path 503a. If, however, pattern detector 604 indicates that the image is 3D compatible, then display controller 605 extracts the left-eye and right-eye image information from the image, optionally processes the left-eye and right-eye information for displaying on a display, and outputs the different left-eye and right-eye images via path 503a. The different images are then provided to the corresponding eyes for a three-dimensional effect.

Figure 1A:
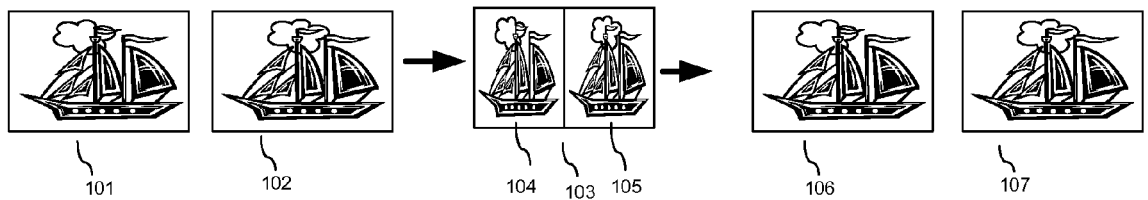
FIGS. 1A and 1B show exemplary images from two exemplary, simplified transmission paths for a 3D-compatible image.
Figure 1B:
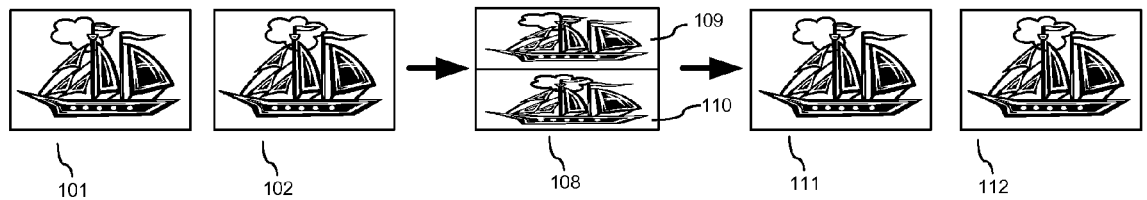
Figure 2:
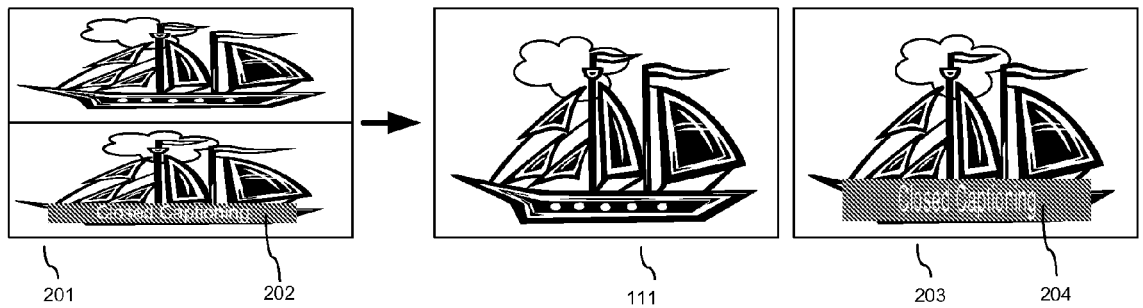
FIG. 2 shows the effects of an exemplary overlay on the 3D-compatible top/bottom image of FIG. 1B.

As previously noted in describing FIG. 2, a potential viewing problem can occur if legacy STB 502, which does not recognize 3D-compatible images as 3D compatible, generates and lays a 2D image, such as closed captioning, over a 3D-compatible image. Neither displaying 2D image 201 nor displaying 3D images 111 and 203 would result in a satisfactory visual output for a viewer. In one implementation of image processor 503 of FIG. 5, image processor 503 determines whether a 3D-compatible image is overlaid with a 2D image and if so, then image processor modifies the left-eye and/or right-eye images in order to preserve both the 2D-overlay and 3D-compatible information of the image. In other words, the corresponding left-eye and right-eye images are generated so as to include substantially the same 2D-overlay information in each corresponding image.

Figure 7:
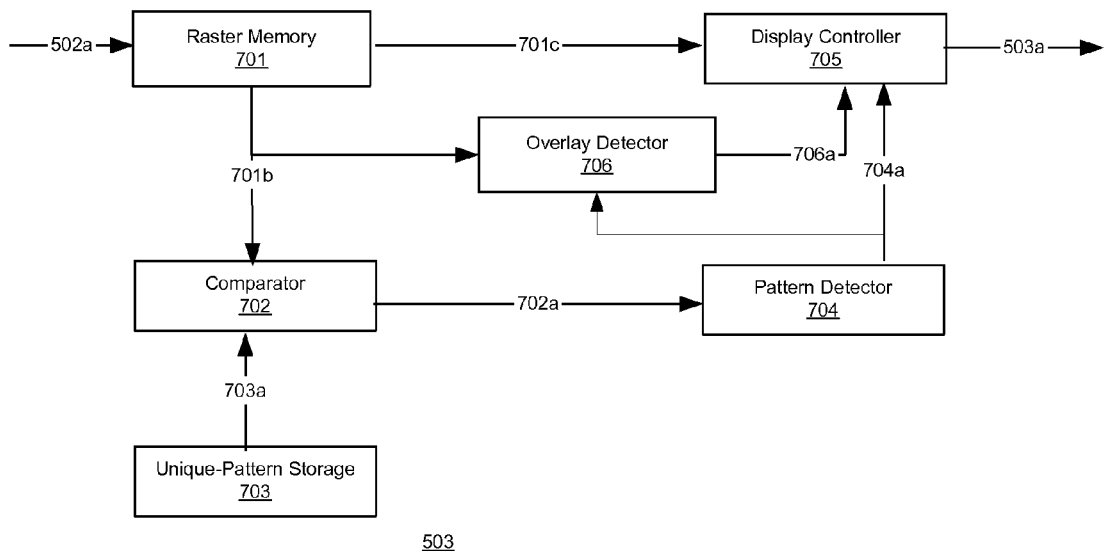
FIG. 7 shows an alternative implementation of the image processor of FIG. 5, in accordance with another embodiment of the present invention.

FIG. 7 shows an alternative implementation of image processor 503 of FIG. 5. Image processor 503 of FIG. 7 comprises components substantially similar to the components of image processor 503 of FIG. 6. Those components are similarly labeled in FIG. 7, but with a different prefix. Raster memory 701, comparator 702, unique-pattern storage 703, and pattern detector 704—as well as paths 701c, 702a, and 703a—operate substantially the same as their counterparts in FIG. 6. Display controller 705, however, performs functions in addition to those of display controller 605, as detailed below. Image processor 503 further comprises overlay detector 706, which determines whether overlay imagery is present over one of the left-eye and right-eye images but not the other.

Overlay detector 706 receives (i) image data from raster memory 701 via path 701b and (ii) a determination as to whether the corresponding image is 3D compatible from pattern detector 704 via path 704a. Pattern detector 704 may also indicate the kind of 3D-compatible image it processed, the location of the separation region, and/or the dimensions of the separation region. If pattern detector 704 indicates that the image is a 2D image, then overlay detector 706 ignores the image since an overlay is not a problem for 2D images, and further processing of the 2D image by overlay detector 706 may be wasteful since an overlay over a 2D image is not a problem and detecting such overlay will be ignored by display controller 705. Aside from determining that an overlay is present, overlay detector 706 may also determine the location and boundaries of the overlay.

Overlay detector 706 outputs its determination and any additional, related information to display controller 705 via path 706a. Display controller 705 then uses the information received from overlay detector 706 to adjust the display of the corresponding image received from raster memory 701. Display controller 705 processes the received image data and the overlay information to generate substantially identical overlays for both the corresponding left-eye and right-eye images, where the overlays correspond to the overlay detected by overlay detector 706.

Figure 8:
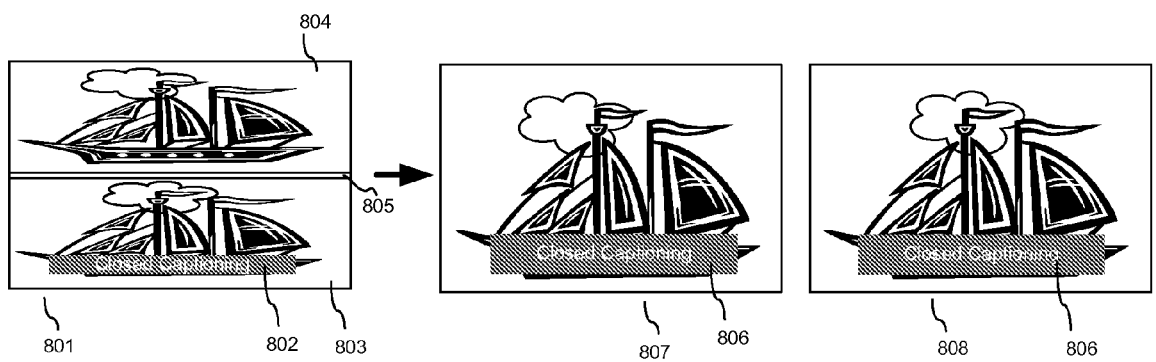
FIG. 8 shows the effect of using the image processor of FIG. 7 to process an image of FIG. 4.

FIG. 8 shows the effect of using image processor 503 of FIG. 7 to process exemplary image 801, which is substantially equivalent to image 400 of FIG. 4, but with overlay CC region 802 forming part of bottom-part image 803. Image 801 further comprises separation region 805 and top-part image 804. Overlay detector 706 determines that image 801 includes an overlay—closed captioning overlay 802—and determines its location and dimensions. It should be noted that a closed captioning overlay is typically in one of two forms. CC region 802 may be just so-called white letters appearing in bottom-part image 803 or CC region 802 may include light-colored letters over a dark rectangular background, for easier viewing of the caption letters, which together are overlaid on top of the background image to form bottom-part image 803. Overlay detector 706 provides the determined information about overlay 802 to display controller 705. Display controller 705 uses the information to recreate the characters (e.g., alphanumeric characters, symbols, etc.) of CC region 802 over a stretched background region that is substantially stretched in the way that the background region of CC overlay 204 of FIG. 2 was stretched. In other words, display controller 705 generates CC overlays with stretched backgrounds but un-stretched characters, relative to the backgrounds and characters of the corresponding original 3D-compatible image. A copy of the resulting CC overlay, CC overlay 806, is then made part of each of left-eye image 807 and right-eye image 808.

Overlay detector 706 uses one or more methods to determine whether an overlay is present in a 3D-compatible image. Suppose, for example, that overlay detector 706 receives (i) image 801 of FIG. 8 and (ii) a determination from pattern detector 704 that image 801 is a 3D-compatible top/bottom image. Overlay detector 706 compares top-part image 804 with bottom-part image 803. One way to perform the comparison is to subtract bottom-part image 803 from top-part image 804, where the result would be an image highlighting differences between the two images. The subtraction may be, for example, of luminance and/or chrominance values of corresponding pixels. It should be noted that the subtraction method works best for overlays that do not obscure the entirety of either the top-part or bottom-part image of a corresponding top/bottom 3D-compatible image.

If the original top-part and bottom-part images were completely identical—in other words, not exhibiting parallax—then the only difference between the top-part image and the overlay-containing bottom-part image would be the presence of the overlay. An algorithm somewhat more complicated than simple corresponding-value subtraction would be used for images exhibiting parallax, where the difference in the non-overlaid portions is mostly the result of an offset due to the parallax. The difference algorithm might use, for example, (1) an adjacent-pixel search, such as used in MPEG (moving picture experts group) compression encoding and decoding for the calculation of motion vectors, (2) fuzzy-logic difference, where, for example, differences might be near a threshold value of a so-called obvious difference between images.

Based on the difference between the overlaid region of the bottom-part image and the corresponding non-overlaid region of the top-part image, the overlay captions may be identified on a pixel by pixel basis. The determination of the boundaries of closed captions may rely on characteristics of the image area where captions were overlaid on top of the bottom-part image. Such characteristics include (i) sharp edges, (ii) bright white fill color, (iii) dark background, and (iv) absence of similar characteristics in the corresponding area of the corresponding top-part image. The pixels of the identified overlay area may then be duplicated over the top-part image.\

The identified and duplicated captions may optionally be blurred to generate a neutral 3D plane for an enhanced appearance of the captions. A neutral plane refers to a portion of a 3D image that appears flat or, in other words, that does not exhibit an appearance of depth. A neutral plane may be formed, for example, by having two image portions, coincident with the neutral plane, located in corresponding positions of corresponding different left-eye and right-eye images and exhibiting no parallax effect. The neutral plane is typically, though not necessarily, made to appear as though at the distance from the viewer of the display screen. The blurring would involve the shifting of pixels in and/or around the captions in the different left-eye and right-eye images in order to create captions that appear separated from their background when viewed on a 3D display, where the shifting does not generally interfere with the apparent 3D perception of the rest of the image.

Overlay detector 706 would operate similarly for side-by-side 3D-compatible images, but would not rely as much on image subtraction for the determination of overlay presence since both a left-eye image and the corresponding right-eye image would have caption letters in similar locations, though the actual captions in each image would generally be different. Instead, the determination that captions are present may be based on characteristics of captions, such as (i) sharp edges, (ii) bright white fill color, (iii) dark background, and (iv) mismatch of identified caption characters with the corresponding area of the corresponding left-side or right-side image. Once an overlay, its location, and its dimensions are identified, that overlay would be duplicated for insertion into both reconstructed images, where the captions are preferably over a dark background covering up the captions in the side-by-side 3D-compatible image, so as to not generate a confusing image of reconstructed captions jumbled with original captions.

Figure 3:
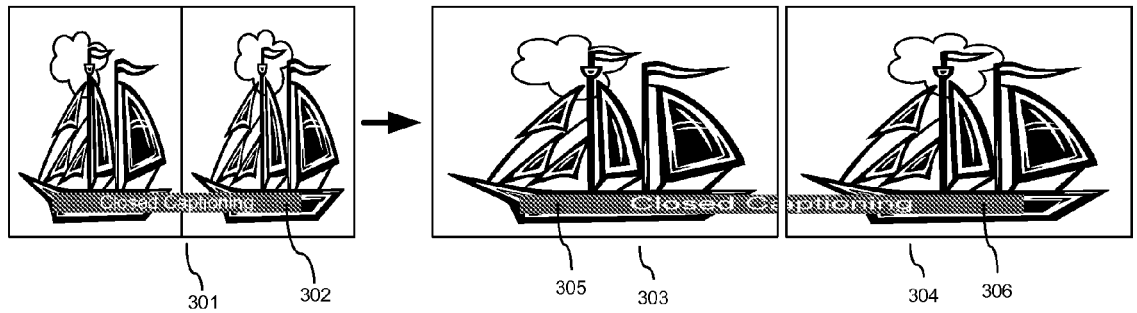
FIG. 3 shows the effects of an exemplary overlay on the 3D-compatible side-by-side image of FIG. 1A.
Figure 9:
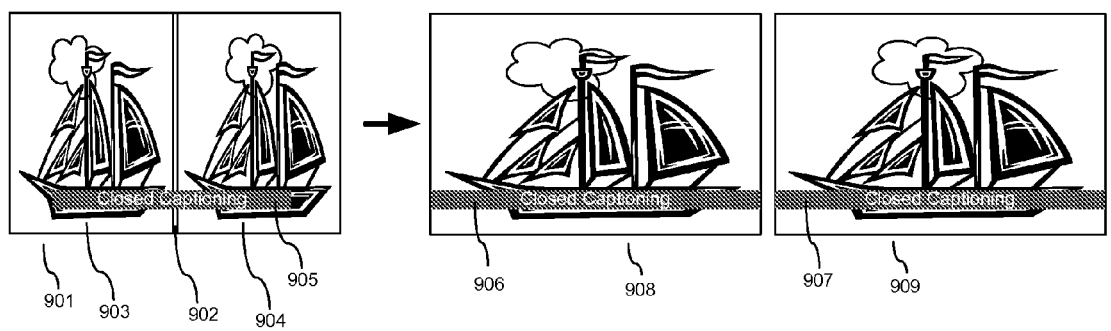
FIG. 9 shows the effect of using the image processor of FIG. 7 to process an image of FIG. 3.

FIG. 9 shows the effect of using image processor 503 of FIG. 7 to process exemplary image 901, which is substantially equivalent to image 301 of FIG. 3, but with separation region 902 separating left-side image 903 from right-side image 904. Image 901 further comprises CC region 905. Overlay detector 706 of FIG. 7 determines that image 901 includes an overlay—closed captioning overlay 905—and determines its location and dimensions. Overlay detector 706 provides the determined information about overlay 905 to display controller 705, which uses that information to generate substantially similar CC overlays 906 and 907. Display controller 705 lays (i) CC overlay 906 over the reconstructed left-eye image to generate left-eye image 908 and (ii) CC overlay 907 over the reconstructed right-eye image to generate right-eye image 909.

Overlay detector 706 may determine the presence of an overlay using the above-described characteristics of captions. Since overlay detector 706 determines characteristics of CC overlay 905 such as the shapes of the caption characters, the shade/color of the caption backgrounds, and the dimensions of the caption background, the caption letters in CC overlays 906 and 907 may be generated in the same size as in CC overlay 905 of source image 901. In other words, the caption letters in CC overlays 906 and 907 do not get stretched out as in FIG. 3. The background region for each of CC overlays 906 and 907 is substantially equivalent to a merger of stretched backgrounds from left-side image 903 and right-side image 904 of source image 901, as described below. Because exemplary CC overlay 905 is one line long and reaches over separation region 902, CC overlays 906 and 907 each reach from one end of their respective frames to the other end. However, a 3D-compatible side-by-side source image with a short CC overlay region that appears over only one side image, without going over the separation region, may result in corresponding reconstructed images having CC overlays that do not reach from one side of a frame to the other.

Figure 10:
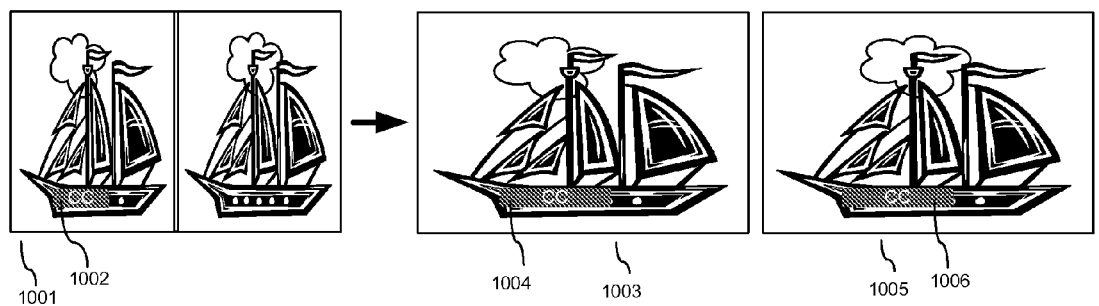
FIG. 10 shows the effect of using the image processor of FIG. 7 to process an image similar to the image of FIG. 9, but with a much shorter captioning overlay.

FIG. 10 shows the effect of processing exemplary image 1001, which is substantially equivalent to image 901 of FIG. 9, but where CC overlay 1002 is much shorter than corresponding CC overlay 905 of FIG. 9. As can be seen, the processing of display controller 705 of FIG. 7 generates left-eye image 1003 with CC overlay 1004 and right-eye image 1005 with CC overlay 1006, where CC overlays 1004 and 1006 are substantially similar, are each located in substantially the same relative position of their respective frames, and whose respective background regions are narrower than the widths of their respective frames, where their respective widths are about twice the width of CC overlay 1002 of source image 1001.

It should be noted that some compact video encoding schemes represent a video frame by relying on information from preceding and/or succeeding frames. In other words, in order to recreate a particular video frame, it would be necessary to also look at one or more preceding and/or succeeding frames. For example, a frame may be defined by differences from or similarities to a preceding and/or succeeding frame. Embodiments of the invention may work with such encoding schemes by, for example, creating and substituting a corresponding un-compacted image for a compacted frame based on the frame and the preceding and/or succeeding frames, as needed.

It should be noted that normally, a separation region, such as separation region 403 of FIG. 4 or separation region 902 of FIG. 9, divides the corresponding image into two equal-area portions so that both eyes get images of equal resolution. In alternative implementations, the separation region is located so as to generate two images of unequal area.

Embodiments of the invention have been described where a transmitted image is determined to be a 3D-compatible image by detecting a unique-pattern separation region in the image. Alternative embodiments use other methods to make that determination. These alternative embodiments do not require using up image space and searching for a separation region. In one implementation, an indicator flag, which indicates that the corresponding image is 3D compatible, is set by the content creator, where the indicator flag may be, for example, a unique-pattern code or a data field associated with the image data. A downstream device, such as, for example, a 3D display, reads the indicator flag and, if the flag indicates a 3D-compatible image, then the device determines it has a 3D-compatible image and transmits a first part to one eye and a second part to the other eye, where the parts are determined, for example, by some predefined algorithm (e.g., top half of the image to the left eye, bottom half of the image to the right eye), or by data in a corresponding data field that indicates what part of the image should be shown to what eye.

In alternative embodiments of image processor 503 of FIG. 6 and FIG. 7, comparators 602 and 702, unique-pattern storages 603 and 703, and pattern detectors 604 and 704 of image processor 503 are eliminated and replaced by a 3D-flag reader (not shown) that determines whether a received image is a 3D-compatible image based on a received data flag corresponding to the received image, as described above. The 3D-flag reader then provides the determination to (i) respective display controllers 605 of FIGS. 6 and 705 of FIG. 7 and/or to (ii) overlay detector 706 of FIG. 7, which uses the determination as described above. The 3D-flag reader may also extract location and dimension information for the left-eye and right-eye images in the received 3D-compatible image from additional received data corresponding to the received 3D-compatible image. Pattern detectors and 3D-flag readers are referred to herein collectively as 3D-compatibility detectors.

Embodiments of the invention have been described where a determination is made that an image is 3D compatible. It should be noted that such a determination is not a necessary element of the invention. In alternative embodiments of the invention, the 3D display either (i) automatically treats all images received from a particular source as 3D compatible or (ii) is manually set to treat a particular image stream as 3D compatible. The 3D display is set to extract left-eye and right-eye images from corresponding predefined areas of a received image. The 3D display continues to monitor for overlays as described above. One exemplary embodiment comprises a modification of image processor 503 of FIG. 7 that includes raster memory 701, overlay detector 706, and display controller 705, and their respective connections, but does not include comparator 702, unique-pattern storage 703, and pattern detector 704 and their respective connections. In one implementation of this exemplary embodiment, overlay detector 706 is adapted to detect full-screen overlays by using characteristics of menu-type full overlays, such as (i) sharp edges, (ii) bright white fill color, (iii) dark background, and (iv) mismatch of identified letters with the corresponding area of the corresponding left-side, right-side, top-part, or bottom-part image.

Embodiments of the invention have been described where display controller 705 of FIG. 7 overlays captions over the left-eye and right-eye images where the CC region background is stretched (horizontally or vertically, as appropriate) but the CC region characters are not stretched in comparison to the corresponding source 3D-compatible image. In alternate embodiments, display controller 705 overlays captions over the left-eye and right-eye images where both the CC region characters and background are stretched in comparison to the corresponding source 3D-compatible image.

Implementations of overlay detector 706 of FIG. 7 have been described that perform detection of 2D overlays only if a 3D-compatibility detector, such as pattern detector 704 or a 3D-compatibility detector (not shown), determines that the corresponding image is a 3D-compatible image. In one alternative implementation of image processor 503 of FIG. 7, overlay detector 706 performs overlay detection regardless of the determination of a 3D-compatibility detector. This implementation may allow for a simpler design than the above-described implementation. In another alternative implementation, the determination of a 3D-compatibility detector is one of a plurality of factors that determine whether overlay detector 706 analyzes a particular image.

It should be noted that, while components have been described as adapted to perform various tasks, not all such abilities are needed in all embodiments of the invention. In other words, in some alternative implementations, one or more of the components do not perform one or more of the corresponding tasks described above.

Embodiments of the invention have been described with overlays in the form of captions. The invention, however, is not limited to caption overlays. In alternative implementations, other types of overlays, such as, for example, an on-screen progress bar showing time remaining during a DVR playback, would be detected and processed by 3D display 501 of FIG. 5.

References herein to the verb "to set" and its variations in reference to values of fields do not necessarily require an active step and may include leaving a field value unchanged if its previous value is the desired value. Setting a value may nevertheless include performing an active step even if the previous or default value is the desired value.

Unless indicated otherwise, the term "determine" and its variants as used herein refer to obtaining a value through measurement and, if necessary, transformation. For example, to determine an electrical-current value, one may measure a voltage across a current-sense resistor, and then multiply the measured voltage by an appropriate value to obtain the electrical-current value. If the voltage passes through a voltage divider or other voltage-modifying components, then appropriate transformations can be made to the measured voltage to account for the voltage modifications of such components and to obtain the corresponding electrical-current value.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

Exemplary embodiments have been described wherein particular entities (a.k.a. modules) perform particular functions. However, the particular functions may be performed by any suitable entity and are not restricted to being performed by the particular entities named in the exemplary embodiments.

Exemplary embodiments have been described with data flows between entities in particular directions. Such data flows do not preclude data flows in the reverse direction on the same path or on alternative paths that have not been shown or described. Paths that have been drawn as bidirectional do not have to be used to pass data in both directions.

References herein to the verb "to generate" and its variants in reference to information or data do not necessarily require the creation and/or storage of new instances of that information. The generation of information could be accomplished by identifying an accessible location of that information. The generation of information could also be accomplished by having an algorithm for obtaining that information from accessible other information.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values stored in a non-transitory recording medium generated using a method and/or an apparatus of the present invention.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

I claim:

1. A method for generating a left-eye image and a right-eye image usable to create a 3D effect, the method comprising:
   (a) receiving a 3D-compatible image having a left-eye portion and a right-eye portion, wherein:
      the 3D-compatible image comprises an overlay overlaying part of at least one of the left-eye portion and the right-eye portion; and
      the overlay has information; and
      the left-eye portion and the right-eye portion do not contain identical overlay information;

(b) generating the left-eye image based on the left-eye portion and the overlay; and (c) generating the right-eye image based on the right-eye portion and the overlay, wherein both of the left-eye and right-eye images include the same information from the overlay.

2. The method of claim 1, wherein:
the overlay corresponds to closed captioning having characters and a background; and
the overlay information corresponds to the characters of the closed captioning.

3. The method of claim 2, further comprising recreating the characters and the background in both the left-eye and right-eye images, wherein:
the recreated characters in the left-eye and right-eye images are substantially the same dimensions as the corresponding characters of the closed captioning overlay; and
the recreated backgrounds in the left-eye and right-eye images are larger than the background of the closed captioning overlay.

4. The method of claim 2, further comprising recreating the characters and the background in both the left-eye and right-eye images, wherein:
the recreated characters in the left-eye and right-eye images appear stretched relative to the corresponding characters of the closed captioning overlay; and
the recreated backgrounds in the left-eye and right-eye images appear stretched relative to the background of the closed captioning overlay.

5. The method of claim 2, wherein:
the left-eye image includes the entirety of the overlay information; and
the right-eye image includes the entirety of the overlay information.

6. The method of claim 1, wherein:
the left-eye portion forms one of a top portion and a bottom portion of the 3D-compatible image;
the right-eye portion forms the other of the top portion and the bottom portion of the 3D-compatible image;
one of the left-eye and right-eye portions has all of the overlay; and
the other of the left-eye and right-eye portions has none of the overlay.

7. The method of claim 1, wherein:
the left-eye portion forms one of a left portion and a right portion of the 3D-compatible image; and
the right-eye portion forms the other of the left portion and the right portion of the 3D-compatible image.

8. The method of claim 7, wherein:
one of the left-eye and right-eye portions has all of the information of the overlay; and
the other of the left-eye and right-eye portions has none of the information of the overlay.

9. The method of claim 7, wherein:
the information of the overlay comprises a non-null first part and a different non-null second part;
the left-eye portion comprises the first part; and
the right-eye portion comprises the second part.

10. The method of claim 1, wherein step (a) further comprises processing the 3D-compatible image to detect the overlay overlaying the 3D-compatible image.

11. The method of claim 10, wherein:
the 3D-compatible image comprises a separation region separating the left-eye and right-eye portions;
the 3D-compatible image is processed to detect the separation region; and the processing to determine whether the overlay is overlaying the 3D-compatible image is performed if and only if the separation region is detected.

12. The method of claim 1, further comprising displaying the left-eye and right-eye images to create the 3D effect.

13. The method of claim 1, wherein:
the overlay is a 2D image generated by a set-top box (STB); and
the STB lays the overlay over the 3D-compatible image without recognizing the 3D-compatible image as 3D compatible.

14. An image processor, comprising:
(a) an overlay detector adapted to receive a 3D-compatible image having a left-eye portion and a right-eye portion, wherein:
the 3D-compatible image comprises an overlay overlaying part of at least one of the left-eye portion and the right-eye portion; and
the overlay has information; and
the left-eye portion and the right-eye portion do not contain identical overlay information; and
(b) a display controller adapted to:
generate a left-eye image based on the left-eye portion and the overlay; and
generate a right-eye image based on the right-eye portion and the overlay, wherein:
both of the left-eye and right-eye images include the same information from the overlay; and
the left-eye and right-eye image are usable to create a 3D effect.

15. The image processor of claim 14, wherein:
the overlay corresponds to closed captioning having characters and a background; and
the overlay information corresponds to the characters of the closed captioning.

16. The image processor of claim 15, wherein:
the display controller is adapted to recreate the characters and the background in both the left-eye and right-eye images;
the recreated characters in the left-eye and right-eye images are substantially the same dimensions as the characters of the closed captioning overlay; and
the recreated backgrounds in the left-eye and right-eye images are larger than the background of the closed captioning overlay.

17. The image processor of claim 15, wherein:
the display controller is adapted to recreate the characters and the background in both the left-eye and right-eye images, wherein:
the recreated characters in the left-eye and right-eye images appear stretched relative to the characters of the closed captioning overlay; and
the recreated backgrounds in the left-eye and right-eye images appear stretched relative to the background of the closed captioning overlay.

18. The image processor of claim 14, wherein the overlay detector is further adapted to process the 3D-compatible image to detect the overlay overlaying the 3D-compatible image.

19. The image processor of claim 18, wherein:
the 3D-compatible image comprises a separation region separating the left-eye and right-eye portions;
the image processor is adapted to process the 3D-compatible image to detect the separation region; and the overlay detector processes the 3D-compatible image to determine whether the overlay is overlaying the 3D-compatible image if and only if the separation region is detected.

20. A device for generating a left-eye image and a right-eye image usable to create a 3D effect, the device comprising:
   (a) means for receiving a 3D-compatible image having a left-eye portion and a right-eye portion, wherein:
      the 3D-compatible image comprises an overlay overlaying part of at least one of the left-eye portion and the right-eye portion; and
      the overlay has information; and
      the left-eye portion and the right-eye portion do not contain identical overlay information;
   (b) means for generating the left-eye image based on the left-eye portion and the overlay; and
   (c) means for generating the right-eye image based on the right-eye portion and the overlay, wherein both of the left-eye and right-eye images include the same information from the overlay.

* * * * *